J. H. Gray,
Dressing Millstones.
N°. 60,176.  Patented Dec. 4, 1866.

Witnesses:
J. B. Cushing
Francis Gould

Inventor:
J. H. Gray

United States Patent Office.

IMPROVED MACHINE FOR PICKING MILLSTONES.

J. H. GRAY, OF BOSTON, MASSACHUSETTS.

Letters Patent No. 60,176, dated December 4, 1866.

SPECIFICATION.

TO ALL WHOM IT MAY CONCERN:

Be it known that I, J. H. GRAY, of Boston, in the county of Suffolk, and State of Massachusetts, have invented an Improved Dressing or Picking Machine for Millstones; and I do hereby declare that the following, taken in connection with the drawings, which accompany and form part of this specification, is a description of my invention sufficient to enable those skilled in the art to practise it.

This machine is intended to be operated for the purpose of dressing or picking the operative surface of millstones, (more especially those which are used for the production of flour from wheat,) with very fine lines, successions or series of which are arranged parallel to each other, though such successions or series are not, as a general thing, made parallel to all the other successions or series.

It is well known to millers and others conversant with the art of milling, that millstones are made with grooves or channels of considerable depth below the general flat operative surfaces of the stones; this machine is not designed or intended to cut or form said grooves or channels, but to make in the general flat surface of the stone, and between the said channels successions, or series of lines or fine cuts, some millers making as many as thirty or forty per inch. The machine may also be used to dress or pick with fine parallel cuts or lines the inclined surface of said large channels or grooves, and also to dress the sharp corner or angle formed by the surface of the stone and that side of each of the large channels or grooves which is square or nearly square thereunto. It has been proposed and attempted to give the peculiar condition of surface which this machine is designed to produce by successive scratches with a diamond, but in practice it is found that the results thus obtained are not sufficiently enduring.

Picking machines have also been invented, which have been organized to be operated automatically by power, which has in some cases been applied through or from the millstone spindle. The difficulty experienced with machines worked by "power" is that all the blows of the tool are given with equal force upon the surface of the stone, which is rarely homogeneous and of equal hardness throughout; and, so far as I know, the power-picking machines have failed to give satisfaction, by reason of the unequal depth of the cuts or lines which they make. At present the desired condition of millstone surfaces is generally obtained in the old way, that is, by the use of a handled tool worked by skillful millers who graduate the force of their blows to the degree of the hardness of the stone.

The object of my invention is first to produce a machine in which the blow shall be given by the miller himself, so as thereby to be by him tempered and graduated in force according to the degree of hardness of the stone in its various parts, and in which, at the same time, there is provision by which straightness of each line is secured, and parallelism of a series of lines or cuts is obtained, together with a mechanical means for determining the distance apart of the cuts, without moving the whole machine; and the first part of my invention consists in a millstone picking machine organized as just stated. In the year 1860 I made application for a patent for a machine embodying therein so much of my invention as has just been stated; but in said application claim was not then made to the substance of said statement, but was made to a certain arrangement and combination of parts, which was, upon examination, alleged to be lacking in novelty. That arrangement and combination I have dispensed with. The object of my invention relates to, and consists in, secondly, such an organization and arrangement of a millstone picking machine, as shall allow of its disposition upon the surface of a stone anywhere at the option of the miller without reference to the centre or to the spindle of the mill, and so that any style or theory of dress of the surface of the stone may be executed thereby under the control of the miller. Another part of my invention consists in adding to the framework of my machine a flange so disposed and arranged as to bear upon the surface of the millstone, and serving for the miller to sit upon while operating the picking tool, thus securing by his weight the machine from moving from its adjustment as to position on the stone. Other parts of my invention consist in the details of construction and arrangement of the members of my machine by which facility and accuracy of working are obtained, and in others by which the cutter is readily removed, and is also properly secured in position. Of the drawings—

Figure 1:
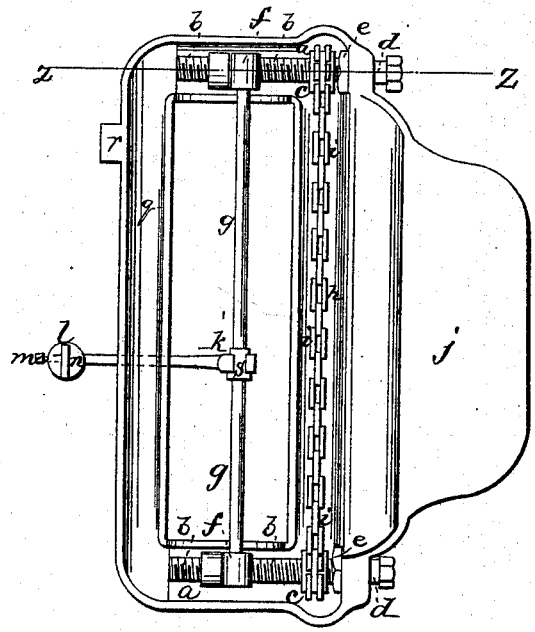
Figure 1 shows my machine in plan in a reversed position.
Figure 2:
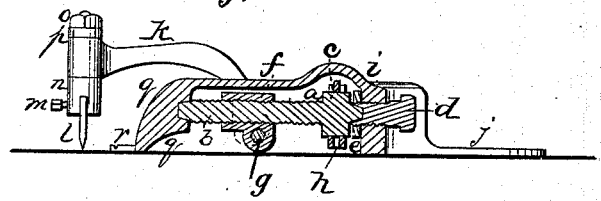
Figure 2 shows the same, right side up, in section taken in the line $z\ z$, fig. 1, and in elevation beyond.

The frame of the machine is a casting made with concavities, as seen, in which parts of the operative mechanism are located and work, and by which they are protected, while the shape given is well adapted to give the requisite strength and stiffness to the machine; and the bottom part of the frame is made into a plane surface, so as to bear evenly on the surface of a millstone. In the two sides, a a, of the frame, are located two screws, b b, each having fixed thereon a chain or rag-wheel c, each screw being made with bearing points or pivots at each end on which it rotates, one pivot entering a step or bearing in the casting, and the other entering a step or bearing made in an adjusting screw, d, there being one such screw for each of the screws, b b, the screws, d d, being provided with suitable check nuts, e. On the screws, b b, there are nuts, f f, in which is fixed the shaft, g, and on and over the rag-wheels passes the endless chain, h, the lower part running in the groove formed in the back bar, i, of the frame, while the upper part passes over said bar where it can be manipulated by the operative; said chain passing through holes in the casting from one to the other side thereof. On the rear of the frame is made a wide, thin flange, j, the lower side of which is an extension of the plane of the lower side of the frame; this flange serves for the miller to sit upon while working the pick, his weight securing the machine in any desired position. The under side of this flange may be recessed, and faced with rubber or leather to aid in keeping the machine from slipping on the surface of the millstone. On the shaft, g, is fitted a long hardened steel sleeve, s, made so as to slide closely but freely lengthwise upon the shaft. The outside of this sleeve is made slightly tapering, so that the forked jaw of the pick helve, k, can be pressed so closely on the sleeve as to adhere thereto and move with it, this construction affording ready and convenient means for removing the pick, l, and its helve, k, from the shaft, g, when the pick requires to be sharpened, as the lower opening of the slot in the helve is wide enough to permit the helve to pass over the shaft when the helve is removed from the sleeve. The pick is fastened by a set-screw, m, in a piece, n, which is journalled to the projecting end of the helve, so that the edge of the pick may be adjusted by turning, to be parallel with the axis of shaft g. The piece, n, is held firmly by a screw and nut, o, at its upper end. The washer, p, is interposed between the nut o, and the helve k, and by varying the diameter of the washer the weight of the blow-giving parts may be changed as desired, while by placing the washer, p, under the helve, the pick carrier may be lowered to suit picks shortened by wear. On the lower side of the front bar, q, of the frame, and near one end thereof, is a piece, r, having therein a slight groove made parallel with the axis of the shaft, g, and with the bottom surface of the machine, the purpose of said groove being to receive the edge of the pick, so as to set it truly parallel with the said surface and axis. This machine is set by the miller on the surface of the stone, and is adjusted thereon much after the manner in which a draughtsman adjusts a parallel rule or triangle on a drawing-board; then the miller, sitting on the flange, j, holds the machine from moving, while with one hand he seizes the helve of the pick and operates it with as much or as little force as the hardness of the stone calls for, using his skill and judgment as he does with the old hand implement; but his work is made easy and is accelerated, inasmuch as he does not have to guide the pick, nor need he fear striking more with one corner than with the other, as the edge of the pick must fall fairly with its whole length on the surface of the stone. With the other hand, the miller moves the endless chain, so as to draw the pick towards him or from him, as he chooses, after completing each line. Practised millers need only the guidance of the eye in determining the distance apart of the lines, but a scale may be added on the upper part of the bar, i, under the chain, and pointers may be placed on the chain by which to indicate, to those who need such aid, the distance which the chain must be moved to produce any given movement of the pick toward or away from the bar, q.

Other indicating devices for the same purpose may be applied, but it is not necessary here to describe them.

I claim a machine for the purpose specified, so arranged and organized that while the pick is guided and controlled as to the direction of its movement, each blow is effected and its force controlled by the operative, substantially as described.

Also the arrangement and organization of a machine for picking millstones, complete and independent in itself, and fitted to be moved over and to operate anywhere upon the surface of such a stone, to produce lines in any direction without attachment to the millstone centre or spindle, substantially as described.

Also the flange j, when combined with the matter forming the second claiming clause herein, and arranged as and for the purpose specified.

Also the combination with a frame a a i q, of two screws b b, and means for simultaneous and equal rotation thereof, when said screws are provided with nuts f f, arranged to move a shaft g, which bears a pick helve.

Also the combination with the shaft g, of the conical sleeve s, thereon, and the slotted hammer helve.

Also the combination with a millstone picking machine of a pick-set r, or guide, for the purpose described.

Also the means described for securing the pick in position, and to the pick helve.

J. H. GRAY.

Witnesses:
   J. B. CROSBY,
   F. GOULD.